(12) United States Patent
Goettl et al.

(10) Patent No.: US 12,551,826 B1
(45) Date of Patent: Feb. 17, 2026

(54) NON-DISCHARGE BACKWASH FILTER SYSTEM

(71) Applicant: Crescent GDG Filter Venture, LLC, Scottsdale, AZ (US)

(72) Inventors: Steven James Goettl, Phoenix, AZ (US); John M. Goettl, Phoenix, AZ (US); Ross Anthony DiJulio, Phoenix, AZ (US)

(73) Assignee: Crescent GDG Filter Venture, LLC, Scottsdale, AZ (US)

( * ) Notice: Subject to any disclaimer, the term of this patent is extended or adjusted under 35 U.S.C. 154(b) by 192 days.

(21) Appl. No.: 18/318,596

(22) Filed: May 16, 2023

Related U.S. Application Data

(63) Continuation of application No. 17/031,652, filed on Sep. 24, 2020, now Pat. No. 11,648,495, which is a continuation of application No. 17/018,934, filed on Sep. 11, 2020, now Pat. No. 11,433,328.

(60) Provisional application No. 62/898,687, filed on Sep. 11, 2019.

(51) Int. Cl.
  *B01D 35/12* (2006.01)
  *C02F 1/00* (2023.01)
  *C02F 103/42* (2006.01)

(52) U.S. Cl.
  CPC .............. *B01D 35/12* (2013.01); *C02F 1/004* (2013.01); *C02F 1/008* (2013.01); *B01D 2201/084* (2013.01); *B01D 2201/165* (2013.01); *C02F 2001/007* (2013.01); *C02F 2103/42* (2013.01); *C02F 2201/005* (2013.01); *C02F 2209/40* (2013.01); *C02F 2303/16* (2013.01)

(58) Field of Classification Search
  None
  See application file for complete search history.

(56) References Cited

U.S. PATENT DOCUMENTS

| | | | | |
|---|---|---|---|---|
| 3,701,426 A | * | 10/1972 | Wetzel | C02F 1/24 210/205 |
| 3,792,773 A | * | 2/1974 | Ross | B01D 37/03 210/275 |
| 4,317,723 A | | 3/1982 | Rapp | |
| 4,556,486 A | | 12/1985 | Merket | |
| 4,988,441 A | | 1/1991 | Moir | |

(Continued)

*Primary Examiner* — Richard C Gurtowski
(74) *Attorney, Agent, or Firm* — Kenneth C. Booth; Booth Udall, PLC

(57) ABSTRACT

A backwash filtration system comprising a backwash discharge port, a sedimentation collection and separation system, and a final filtration chamber. The backwash discharge port is coupled with a pool filter system and is configured to pass backwashed water from the pool filter system to the sedimentation collection and separation system. The sedimentation collection and separation system has a plurality of sedimentation chambers that are vertically stacked and a plurality of baffles configured to reduce the migration of sediment within the sedimentation chambers. A path for water flow passes down sequentially through each of the sedimentation chambers. The final filtration chamber receives the backwashed water from the sedimentation collection and separation system, filters the backwashed water through a final filtration medium, and passes the filtered water to a water return line of the pool filter system or to a pool of water.

20 Claims, 14 Drawing Sheets

(56) References Cited

U.S. PATENT DOCUMENTS

| | | |
|---|---|---|
| 9,970,558 B1 | 5/2018 | Chandler, Jr. |
| 2011/0000849 A1 | 1/2011 | Lee |
| 2011/0100924 A1 | 5/2011 | Duesel, Jr. |
| 2014/0097130 A1 | 4/2014 | Wilfong |
| 2014/0097143 A1 | 4/2014 | Clements |
| 2016/0051908 A1 | 2/2016 | Meyer |
| 2017/0259197 A1 | 9/2017 | Vette |
| 2017/0260064 A1 | 9/2017 | Mueller |
| 2021/0236964 A1 | 8/2021 | Afshar |

* cited by examiner

NON-DISCHARGE BACKWASH FILTER SYSTEM

CROSS REFERENCE TO RELATED APPLICATIONS

This application is a continuation of U.S. patent application Ser. No. 17/031,652 entitled "Non-Discharge Backwash Filter System" to Goettl et. al. that was filed on Sep. 24, 2020, which application is a continuation of U.S. patent application Ser. No. 17/018,934 entitled "Non-Discharge Backwash Filter System" to Goettl et. al. that was filed on Sep. 11, 2020, which application claims the benefit of the filing date of U.S. Provisional Patent Application No. 62/898,687 entitled "Non-Discharge Backwash Filter System" to Goettl et. al. that was filed on Sep. 11, 2019, the disclosures of which are hereby incorporated herein by this reference.

TECHNICAL FIELD

Aspects of this document relate generally to a pool filter system, and more specifically to a pool filter system that reduces water waste and maintenance through recycling the backwash water through a separate filter system simultaneous with pool filtering.

BACKGROUND

Conventionally, there are three primary types of filters that are commonly used within the swimming pool industry. They are the sand media filter, cartridge media filter and diatomaceous earth (DE) media filter. Each filter type has perceived advantages and disadvantages.

A sand filter is the simplest to clean via a manual backwash function common to sand filters that reverses the normal flow of water through the filtration media, lifting the sediment into the reverse flow of water (backwash). The water is then discharged to waste or landscape. The typical backwash cycle discharges a substantial amount of water, and that water is wasted and not reused or recycled. This is extremely wasteful of water resources. While a sand filter is the most common filter type, there is a growing concern that current and future regulatory, municipal and HOA restrictions may limit the use of sand filters with standard backwash due to the consumption and disposal of backwash water which is significant. The standard sand filter backwash formula for determining the water used is: filter surface area SF×15 GPM×backwash duration in minutes (minimum 2-3 minutes). Example: 4.9 Square Foot filter×15 GPM=73.5 GM; 73.5 GPM×2.5 minute backwash duration=183.75 gallons used for a backwash interval. Therefore, the total water loss to backwash a common 4.9 size sand filter=184 gallons. Based on the recommended once per week backwash intervals for common sized pools, water losses can exceed 1000 gallons per month due to backwash functions.

Both DE and cartridge filers have filter cartridges or replacement media that are costly and labor intensive to service and clean. Each filter provides varied levels of efficiency. However, much of the cleaning efficiency is also dependent on proper sizing, service, maintenance and water flow rates through the filter. DE and cartridge filters also involve water waste, most often through cleaning or washing of the filter cartridges. Backwash and cleaning water disposal challenges for all filter media types further become compounded with limited physical spaces associated commonly with new construction subdivisions.

All major swimming pool filter types load with sediment during operation causing the pressure loss to increase significantly across the media as the filter loads with sediment, thus decreasing water flow and increasing energy costs due to higher-than-otherwise-required motor powers to generate the required water flow at the higher pressure required to compensate for the sediment accumulation within the filter media. Cleaning intervals are typically each week for sand filters and can be months with cartridge filters. This causes significant restriction in water flow and consumes excessive pump motor horsepower as well as inhibits water flow to pool system components resulting in reduced performance and efficiency of the entire pool. Manual cleaning and maintenance of current technology filter media types is unpredictable and leads often to dramatic inefficiencies throughout the pool system causing poor system performance and dramatic losses of efficiency and high energy consumption.

Additionally, conventional filter technologies require that the normal operation of the pool must be stopped to clean or replace the filtration media. Stopping the normal operation of a pool is not preferred by the user and causes interruption of normal pool component functions and is very time consuming. Interruptions of normal pool component functions leads to additional pool system inefficiencies and wasted energy. Cleaning or replacing filtration media of currently available filter technologies is costly and results in excessive active or passive water resource losses, filter media replacement costs and service labor costs.

SUMMARY

Aspects of this document relate to a pool filter system comprising a main body comprising a plurality of segmented filtration chambers within the main body each filled with filtration media and fluidly isolated from each other except near their respective upper ends and lower ends, a water supply inlet extending into the main body, the water supply inlet configured to receive unfiltered water from a pool of water, a water return line configured to return filtered water to the pool of water, a control valve disposed within the main body and fluidly coupled to the water supply inlet, the control valve comprising a plurality of filtration chamber ports each aligned with the respective upper ends of a different one of the plurality of segmented filtration chambers, a backwash nozzle configured to rotate within the control valve and sequentially align with each of the plurality of filtration chamber ports, and an internal backwash discharge valve in fluid communication with the backwash nozzle and a backwash discharge port, the internal backwash discharge valve configured to control discharge of water from the backwash nozzle to the backwash discharge port, wherein in a first position, the backwash nozzle is aligned with a first filtration chamber port of the plurality of filtration chamber ports which is aligned with a first segmented filtration chamber of the plurality of segmented filtration chambers, and the control valve is configured to supply water through the plurality of filtration chamber ports to all of the segmented filtration chambers except the first segmented filtration chamber aligned with the backwash nozzle, and supply water from the first segmented filtration chamber to the backwash nozzle through the first filtration chamber port, and wherein in a second position, the backwash nozzle is aligned with a second filtration chamber port of the plurality of filtration chamber ports which is aligned with a second segmented filtration chamber of the plurality of segmented filtration chambers, and the control valve is configured to supply water through the plurality of filtration chamber ports to all of the segmented filtration chambers except the second segmented filtration chamber aligned with the backwash nozzle, and supply water from the second segmented filtration chamber to the backwash nozzle through the second filtration chamber port, and a reverse flow discharge manifold adjacent the lower ends of the segmented filtration chambers and configured to pass filtered water into and out of each of the segmented filtration chambers, and pass filtered water to the water return line, wherein when water pressure increases within the reverse flow discharge manifold, the increase in water pressure causes water to backwash through the first segmented filtration chamber to the backwash nozzle when the backwash nozzle is in the first position and through the second segmented filtration chamber to the backwash nozzle when the backwash nozzle is in the second position.

Particular embodiments may comprise one or more of the following features. The internal backwash discharge valve may be configured to open for a predetermined amount of time corresponding to a predetermined volume of backwash water. Each of the plurality of segmented filtration chambers may have a curved shape configured to accommodate a pressure differential between each of the plurality of segmented filtration chambers. The backwash nozzle may have an intermediate position between the first position and the second position, wherein when the backwash nozzle is in the intermediate position, the backwash nozzle is not aligned with any of the filtration chamber ports of the plurality of filtration chamber ports, and the control valve is configured to supply water through the plurality of filtration chamber ports to all of the segmented filtration chambers. The pool filter system may further comprise a backwash filtration system, wherein the backwash discharge port discharges backwashed water into the backwash filtration system. The backwash filtration system may have a sedimentation collection and separation system configured to settle sediment out of the backwashed water. The backwash filtration system may further have a final filtration chamber, wherein the sedimentation collection and separation system is configured to pass water to the final filtration chamber and a final filtration medium within the final filtration chamber is configured to filter water and return the filtered water to the pool of water. The pool filter system may further comprise a sensor in the final filtration chamber configured to sense water conditions and provide conditioning to the water based on the water conditions.

Aspects of this document relate to a pool filter system comprising a plurality of segmented filtration chambers each comprising filtration media and fluidly isolated from each other except adjacent their respective upper ends and lower ends, a water supply inlet configured to receive unfiltered water from a pool of water, a water return line configured to return filtered water to the pool of water, a control valve fluidly coupled to the water supply inlet, the control valve comprising a plurality of filtration chamber ports each aligned with the respective upper ends of a different one of the plurality of segmented filtration chambers, and a backwash nozzle configured to sequentially align with each of the plurality of filtration chamber ports and pass backwashed water to a backwash discharge port, wherein in a first position, the backwash nozzle is aligned with a first filtration chamber port of the plurality of filtration chamber ports which is aligned with a first segmented filtration chamber of the plurality of segmented filtration chambers, and the control valve is configured to supply water through the plurality of filtration chamber ports to all of the segmented filtration chambers except at least the first segmented filtration chamber aligned with the backwash nozzle, and supply water from the first segmented filtration chamber to the backwash nozzle through the first filtration chamber port, and wherein in a second position, the backwash nozzle is aligned with a second filtration chamber port of the plurality of filtration chamber ports which is aligned with a second segmented filtration chamber of the plurality of segmented filtration chambers, and the control valve is configured to supply water through the plurality of filtration chamber ports to all of the segmented filtration chambers except at least the second segmented filtration chamber aligned with the backwash nozzle, and supply water from the second segmented filtration chamber to the backwash nozzle through the second filtration chamber port, and a reverse flow discharge manifold adjacent the lower ends of the segmented filtration chambers and configured to pass filtered water into and out of each of the segmented filtration chambers, and pass filtered water to the water return line, wherein when water pressure increases within the reverse flow discharge manifold, the increase in water pressure causes water to backwash through the first segmented filtration chamber to the backwash nozzle when the backwash nozzle is in the first position and through the second segmented filtration chamber to the backwash nozzle when the backwash nozzle is in the second position.

Particular embodiments may comprise one or more of the following features. The pool system may further comprise an internal backwash discharge valve in fluid communication with the backwash nozzle and the backwash discharge port, the internal backwash discharge valve configured to control discharge of water from the backwash nozzle to the backwash discharge port. The internal backwash discharge valve may be configured to open for a predetermined amount of time corresponding to a predetermined volume of backwash water. The backwash nozzle may have an intermediate position between the first position and the second position, wherein when the backwash nozzle is in the intermediate position, the backwash nozzle is not aligned with any of the filtration chamber ports of the plurality of filtration chamber ports, and the control valve is configured to supply water through the plurality of filtration chamber ports to all of the segmented filtration chambers. The pool filter system may further comprise a backwash filtration system, wherein the backwash nozzle discharges backwashed water into the backwash filtration system.

Aspects of this document relate to a pool filter system comprising a plurality of separate filtration chambers each comprising filtration media and respective upper ends and respective lower ends, a water supply inlet configured to receive unfiltered water from a pool of water, and a control valve fluidly coupled to the water supply inlet, the control valve comprising a backwash nozzle configured to sequentially align with each of the plurality of filtration chambers, wherein in a first position, the backwash nozzle is aligned with a first filtration chamber of the plurality of filtration chambers, and the control valve is configured to supply water to all of the filtration chambers through the respective upper ends of each of the plurality of filtration chambers except at least the first filtration chamber aligned with the backwash nozzle, and supply water from the first filtration chamber to the backwash nozzle through the upper end of the first filtration chamber, wherein in a second position, the backwash nozzle is aligned with a second filtration chamber of the plurality of filtration chambers, and the control valve is configured to supply water to all of the filtration chambers through the respective upper ends of each of the plurality of filtration chambers except at least the second filtration chamber aligned with the backwash nozzle, and supply water from the second filtration chamber to the backwash nozzle through the upper end of the second filtration chamber, and wherein when water pressure increases adjacent the lower ends of the filtration chambers, the increase in water pressure causes water to backwash through the first filtration chamber to the backwash nozzle when the backwash nozzle is in the first position and through the second filtration chamber to the backwash nozzle when the backwash nozzle is in the second position.

Particular embodiments may comprise one or more of the following features. The pool filter system may further comprise an internal backwash discharge valve in fluid communication with the backwash nozzle and a backwash discharge port, the internal backwash discharge valve configured to control discharge of water from the backwash nozzle to the backwash discharge port. The internal backwash discharge valve may be configured to open for a predetermined amount of time corresponding to a predetermined volume of backwash water. The backwash nozzle may have an intermediate position between the first position and the second position, wherein when the backwash nozzle is in the intermediate position, the backwash nozzle is not aligned with any of the filtration chambers, and the control valve is configured to supply water to all of the filtration chambers. The pool filter system may further comprise a backwash filtration system, wherein the backwash nozzle discharges backwashed water into the backwash filtration system. The pool filter system may further comprise a water return line configured to return filtered water to the pool of water from the plurality of filtration chambers. Each of the plurality of filtration chambers may have a curved shape configured to accommodate a pressure differential between each of the plurality of filtration chambers.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
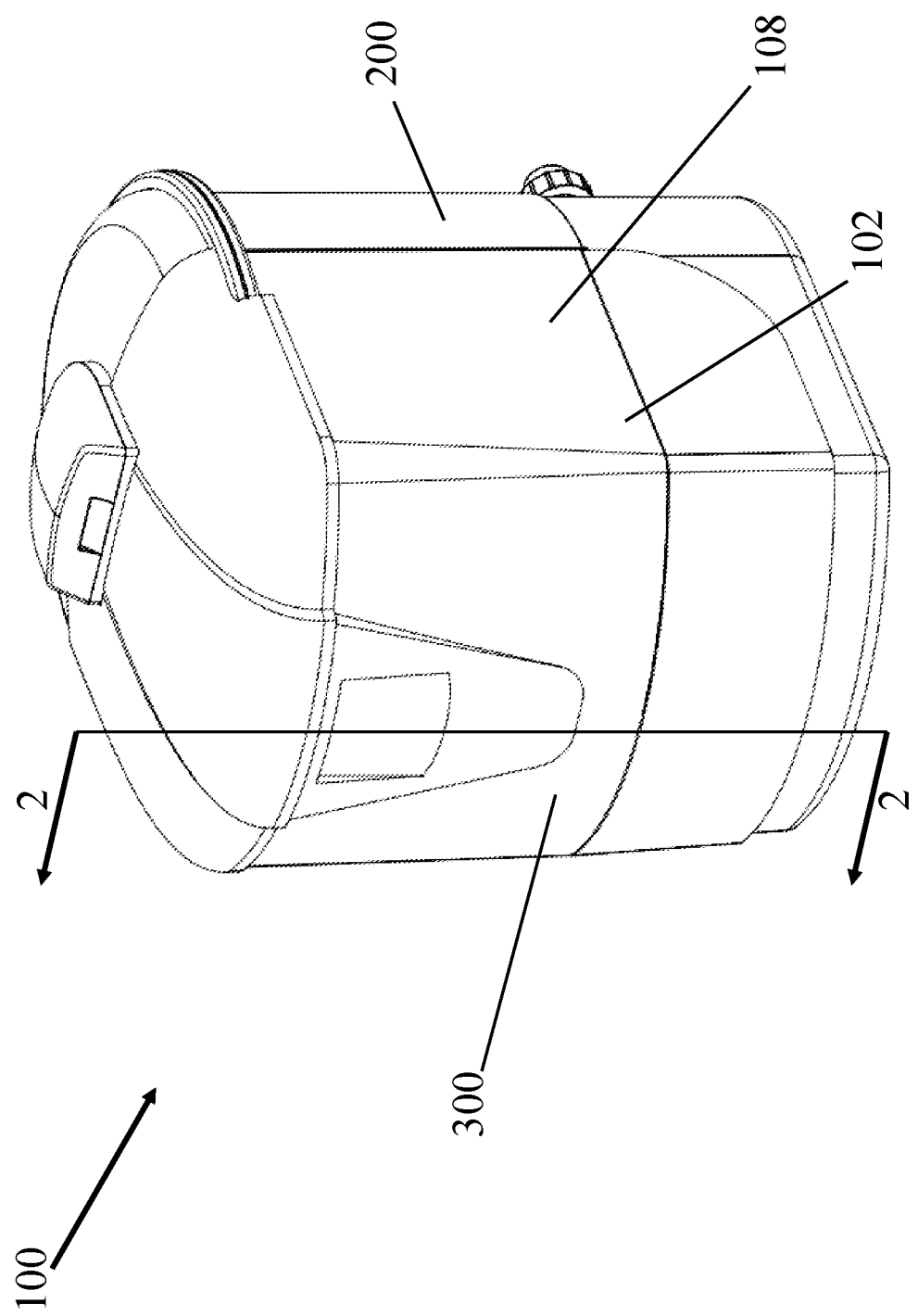
FIG. 1 is a perspective view of a pool filter and backwash filtration system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 2:
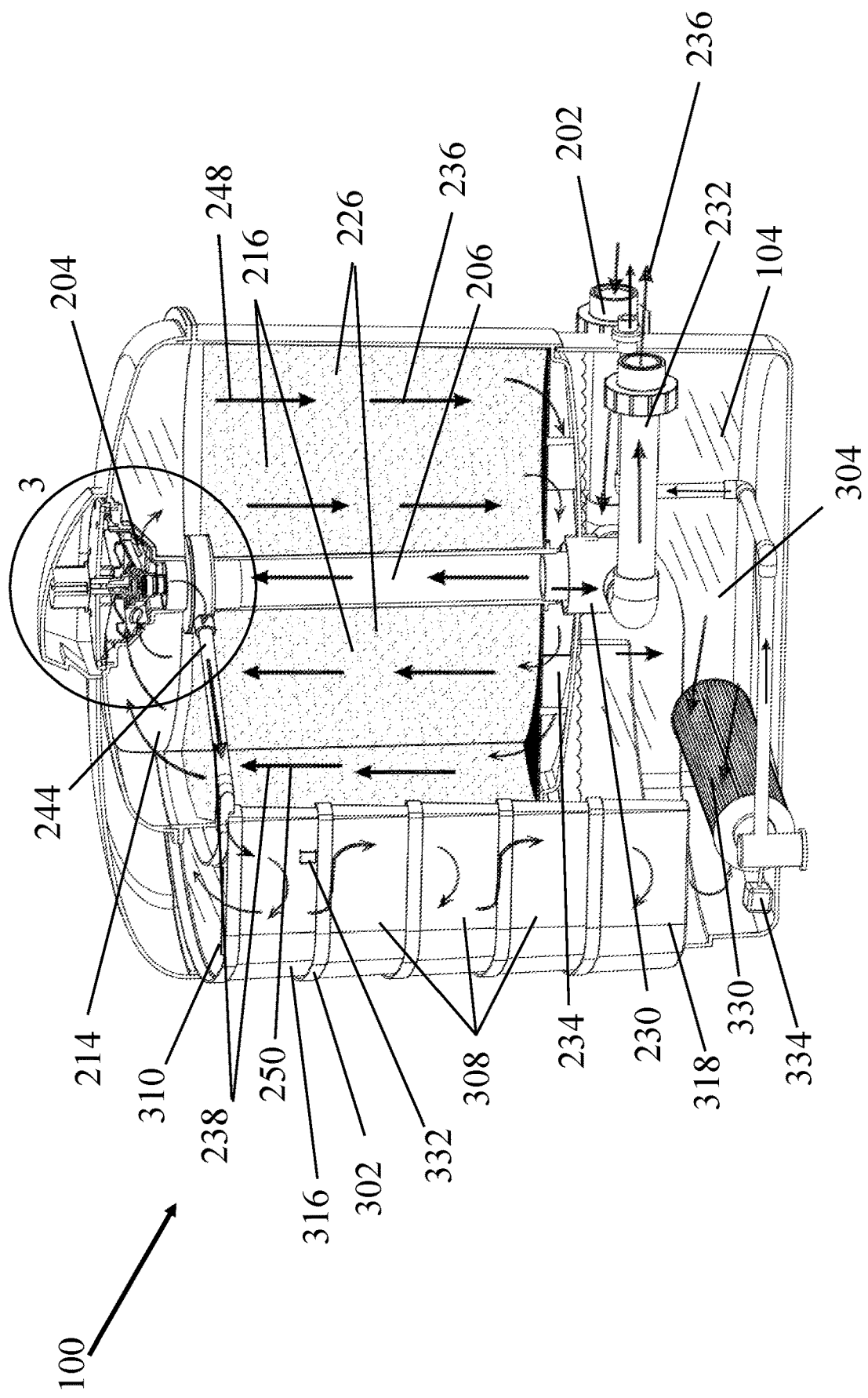
FIG. 2 is a cross section view of the pool filter and backwash filtration system of FIG. 1, taken along line 2-2.
Figure 3:
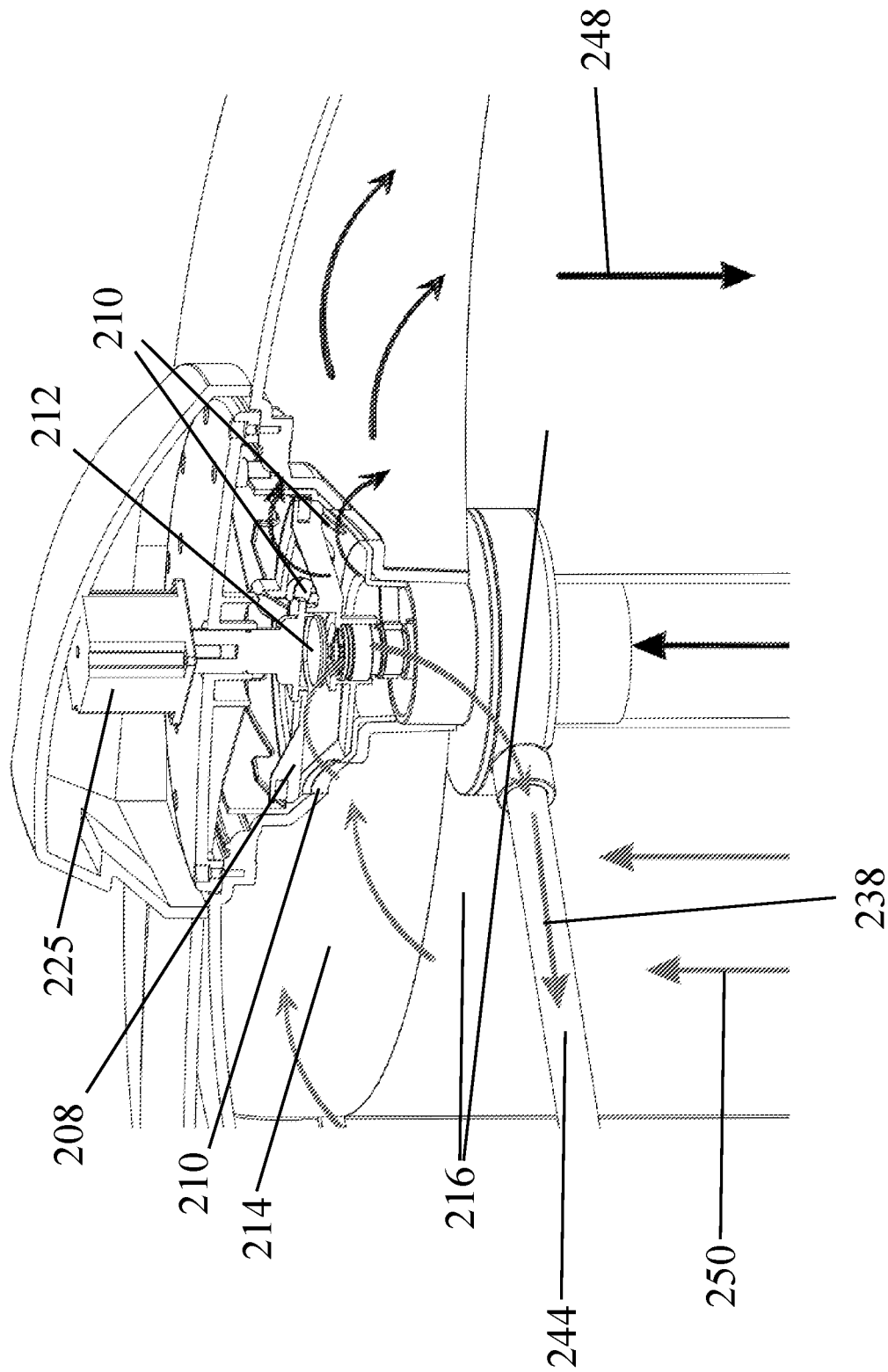
FIG. 3 is a close up view of the control valve shown in FIG. 2, taken from circle 3.

FIGS. 1-2 illustrate a pool filter and backwash filtration system 100 that comprises a pool filter system 200 and a backwash filtration system 300. The pool filter and backwash filtration system 100 may be housed within a main body 102, such as a pool filter housing 108. The pool filter system 200 is configured to filter pool water 104 at full capacity for a pool of water 106 (not shown) and backwash a portion of the filter media 226 simultaneously, without any need for interruption of the ongoing filtering of the pool water 104. Alternatively, the pool filter system 200 may be configured to first filter the pool water 104 and then backwash the filter media 226. In either embodiment, the water 104 that is typically discharged during backwash to waste or the environment may instead be passed to the backwash filtration system 300. The backwash filtration system 300 is configured to filter the backwash water 104 and return it to the pool filter system 200 or to the pool of water 106, which returns the water 104 to the pool of water 106. Thus, the significant water losses of the typical backwash cycle are avoided through the implementation of the pool filter and backwash filtration system 100. In addition, in embodiments where the pool filter system 200 and the backwash filtration system 300 are integrated into one system, the filtration and backwash functions can be automated and performed as often as is useful, thus limiting the human labor involved and maximizing the efficiency and performance of the system. For example, a typical pool filter requires regular cleaning that does not occur because the labor involved discourages the pool owner from taking action. This failure to clean causes poor system performance, dramatic losses of efficiency, and higher energy consumption, as discussed above. Implementing the pool filter and backwash filtration system 100 avoids these issues by limiting the need for an individual to get involved at all. Due to the ongoing and automatic backwash operation of the pool filter system 200, the pool filter system 200 operates at a predictable pressure loss and does not experience fluctuations like a conventional pool filter does. Instead, the pressure drop across the filter media 226 remains at consistent low levels.

Figure 4:
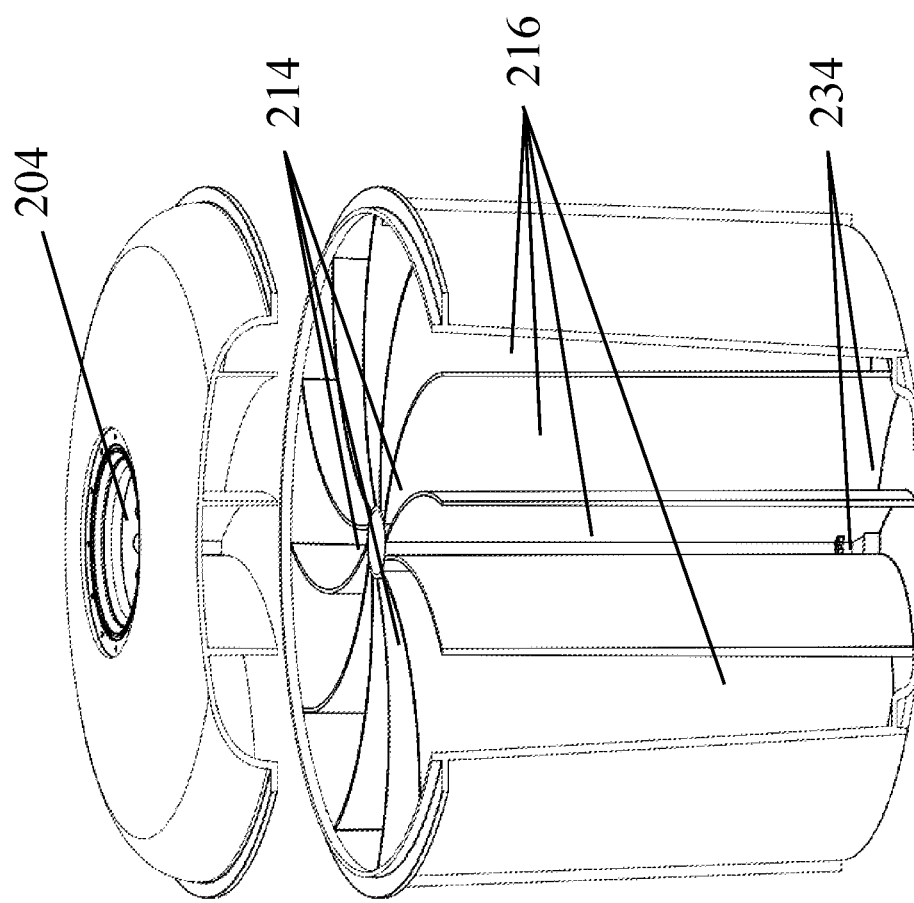
FIG. 4 is a perspective view of the main body of the pool filter system from FIG. 1.
Figure 5:
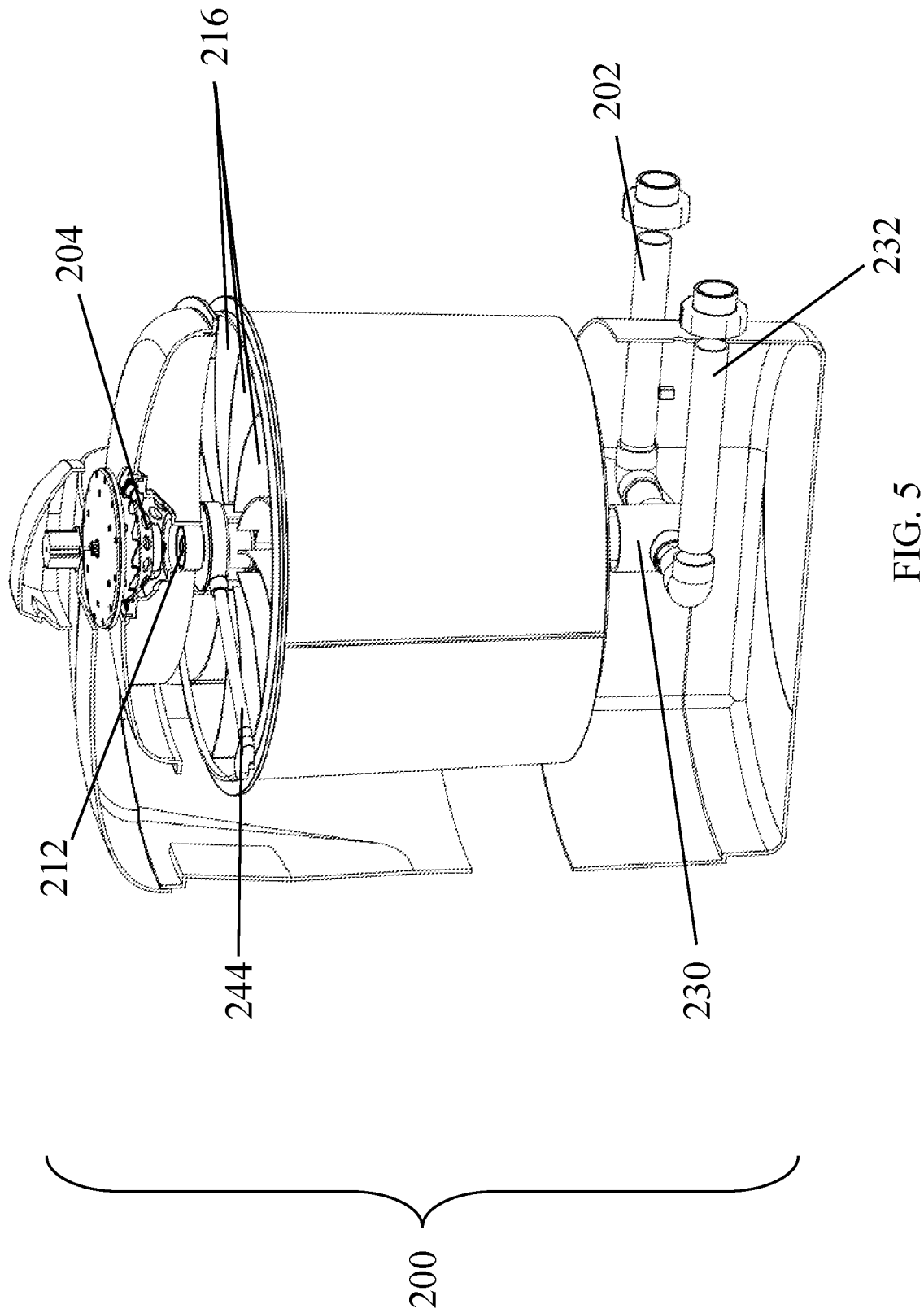
FIG. 5 is an exploded view of the pool filter system of FIG. 1.
Figure 6:
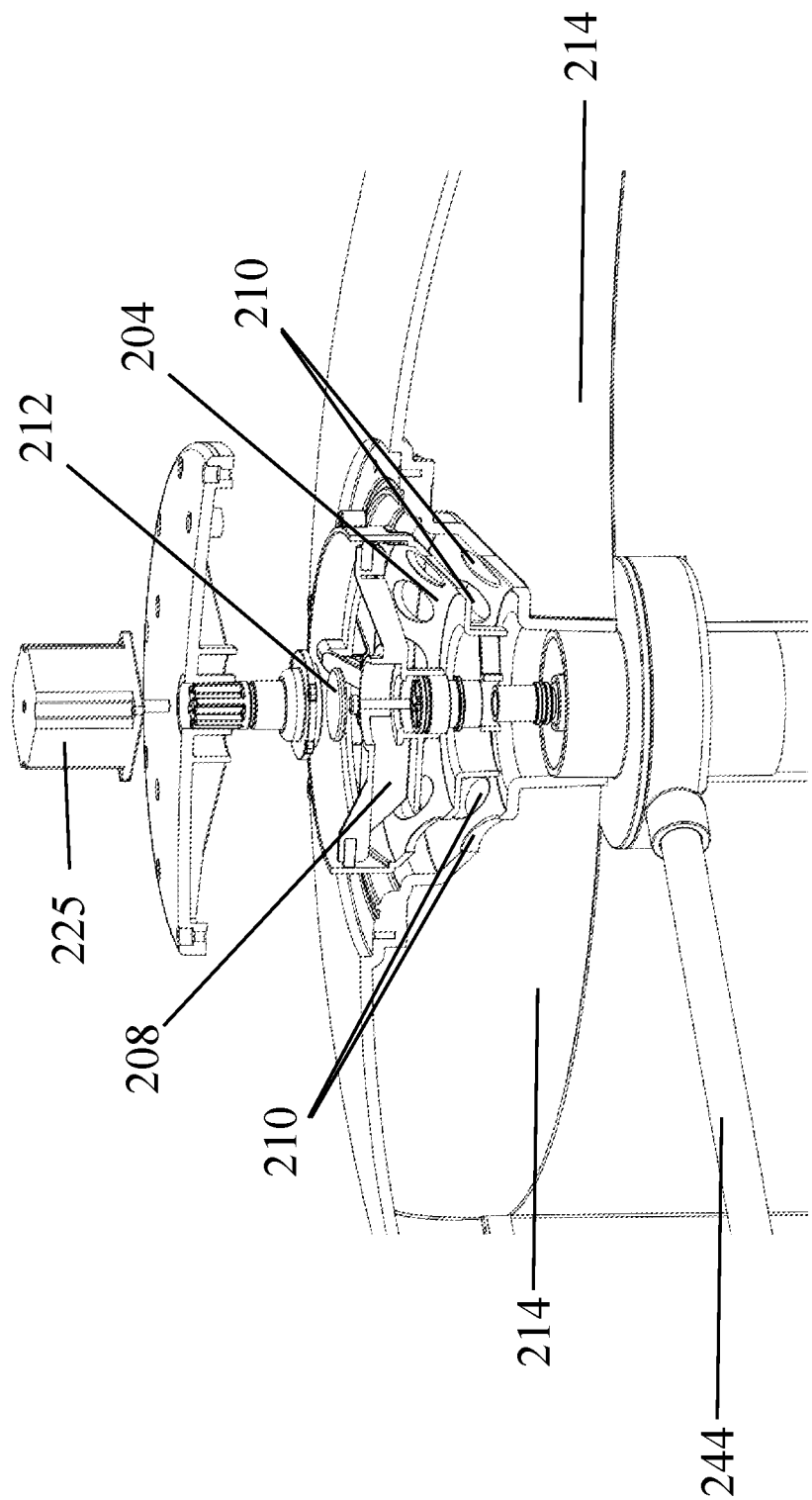
FIG. 6 is an exploded view of the control valve area shown in FIG. 3.

FIG. 2 illustrates pool water flow through the pool filter and backwash filtration system 100 when the pool filter system 200 is simultaneously filtering pool water 104 and backwashing a portion of the filter media 226. Water flow is indicated by arrows shown in the Figure. Water 104 from the pool of water 106 enters the pool filter system 200 through a water supply inlet 202. The water 104 is passed from the water supply inlet 202 to a control valve 204 fluidly coupled to the water supply inlet 202. As shown in FIG. 2, the water 104 may be passed up through a center 206 of the pool filter system 200 to the control valve 204. As shown in more detail in FIGS. 3-7C, the control valve 204 may have a backwash nozzle 208, a plurality of filtration chamber ports 210, and an internal backwash discharge valve 212. Each of the plurality of filtration chamber ports 210 is aligned with the respective upper ends 214 of a different one of a plurality of filtration chambers 216 (see FIG. 4). Each of the plurality of filtration chambers 216 is segmented and may have a curved shape configured to accommodate a pressure differential between each of the plurality of filtration chambers 216 (FIG. 4). When used, the curved shape reinforces the strength for the walls of each filtration chamber 216. Each of the plurality of filtration chambers 216 may be fluidly isolated from each other except near their respective upper ends 214 and lower ends 234.

The backwash nozzle 208 is configured to sequentially align with each of the plurality of filtration chambers 216. The backwash nozzle 208 may be actuated electronically, hydronically, or mechanically. When the backwash nozzle 208 is aligned with a particular filtration chamber of the plurality of filtration chambers 216, the backwash nozzle 208 limits the flow of water 104 from the control valve 204 to the particular filtration chamber through the upper end 214 of the particular filtration chamber to be backwashed. For example, in a first position 218, the backwash nozzle 208 is aligned with a first filtration chamber 220 of the plurality of filtration chambers 216 (see FIG. 7A). When in the first position 218, the backwash nozzle 208 limits the flow of water 104 from the control valve 204 to the first filtration chamber 220 through the upper end 214 of the first filtration chamber 220. As another example, in a second position 222, the backwash nozzle 208 is aligned with a second filtration chamber 224 of the plurality of filtration chambers 216 (see FIG. 7B). When in the second position 222, the backwash nozzle 208 limits the flow of water 104 from the control valve 204 to the second filtration chamber 224 through the upper end 214 of the first filtration chamber 224. In a particular embodiment, the backwash nozzle 208 is configured to rotate within the control valve 204 to sequentially align with each of the plurality of filtration chambers 216. An actuator 225 may be coupled with the backwash nozzle 208 to rotate the backwash nozzle 208. In addition, the backwash nozzle 208 may align with more than one of the filtration chambers 216 at any given time. For example, the backwash nozzle 208 may be sized to align with both the first filtration chamber 220 and with the second filtration chamber 224 simultaneously.

Returning to FIG. 2, the control valve 204 supplies the water 104 to the plurality of filtration chambers 216 except the filtration chamber aligned with the backwash nozzle 208. Each of the plurality of filtration chambers 216 contains filter media 226 which is configured to filter sediment 228 (not shown) out of the water 104. Each of the plurality of filtration chambers 216 may then pass the filtered water 104 to a reverse flow discharge manifold 230 through the lower ends 234 of the plurality of filtration chambers 216. The reverse flow discharge manifold 230 is configured to pass the filtered water 104 into and out of each of the filtration chambers 216 and pass the water 104 to a water return line 232, which returns the water 104 to the pool of water 106. Alternatively, the lower ends 234 of the plurality of filtration chambers 216 may be in fluid communication with each other and with the water return line 232 and the filtered water 104 may be passed directly from the plurality of filtration chamber 216 to the water return line 232.

As the pool filter system 200 operates, the water pressure within the reverse flow discharge manifold 230 or adjacent the lower ends 234 of the plurality of filtration chambers 216 may increase. Because the water 104 does not freely flow through the filtration chamber aligned with the backwash nozzle 208, such as the first filtration chamber 220 when the backwash nozzle 208 is in the first position 218 or the second filtration chamber 224 when the backwash nozzle 208 is in the second position 222, the increase in water pressure causes the water 104 to backwash through the filtration chamber (or filtration chambers) currently aligned with the backwash nozzle 208. Therefore, during a backwash cycle, the water 104 is split into a first stream of water 236 and a second stream of water 238. The first stream of water 236 passes through the plurality of filtration chambers 216 and then is returned to the pool of water 106 through the water return line 232. The second stream of water 238 backwashes through the filtration chamber aligned with the backwash nozzle 208 and then passes through the upper end 214 of the filtration chamber aligned with the backwash nozzle 208 and, in embodiments having a plurality of filtration chamber ports 210, through the corresponding filtration chamber port to the backwash nozzle 208. For example, when the backwash nozzle 208 is in the first position 218, the second stream of water 238 passes through the first filtration chamber 220, through the upper end 214 of the first filtration chamber 220, and through a first filtration chamber port 240 of the plurality of filtration chamber ports 210 to the backwash nozzle 208. As another example, when the backwash nozzle 208 is in the second position 222, the second stream of water 238 passes through the second filtration chamber 224, through the upper end 214 of the second filtration chamber 224, and through a second filtration chamber port 242 of the plurality of filtration chamber ports 210 to the backwash nozzle 208. As a third example, if the backwash nozzle 208 is sized to align with both the first filtration chamber 220 and the second filtration chamber 224 simultaneously and is aligned with both simultaneously, the second stream of water 238 passes through both the first filtration chamber 220 and the second filtration chamber 224, through the upper ends 214 of the first filtration chamber 220 and the second filtration chamber 224, and through the first filtration chamber port 240 and the second filtration chamber port 242 to the backwash nozzle 208.

Returning to FIG. 3, the backwash nozzle 208 directs the water 104 coming out of the upper end 214 of the filtration chamber aligned with the backwash nozzle 208 to the internal backwash discharge valve 212, which is configured to control the discharge of water 104 from the backwash nozzle 208 to a backwash discharge port 244. For example, the internal backwash discharge valve 212 may be configured to open for a predetermined amount of time corresponding to a predetermined volume of backwash water. When the internal backwash discharge valve 212 is closed, the flow of water 104 through the backwash nozzle 208 is stopped. The predetermined volume of backwash water may be based on the volume capacity for water of the backwash filtration system 300. The predetermined amount of time may be determined based on the predetermined volume of backwash water and on the flow rate of water 104 through the backwash nozzle 208. The backwash discharge port 244 may discharge the water 104 to the backwash filtration system 300 (see FIG. 2), or directly to the environment from the discharge port 244 in cases where a backwash filtration system 300 is not used.

Figure 7A:
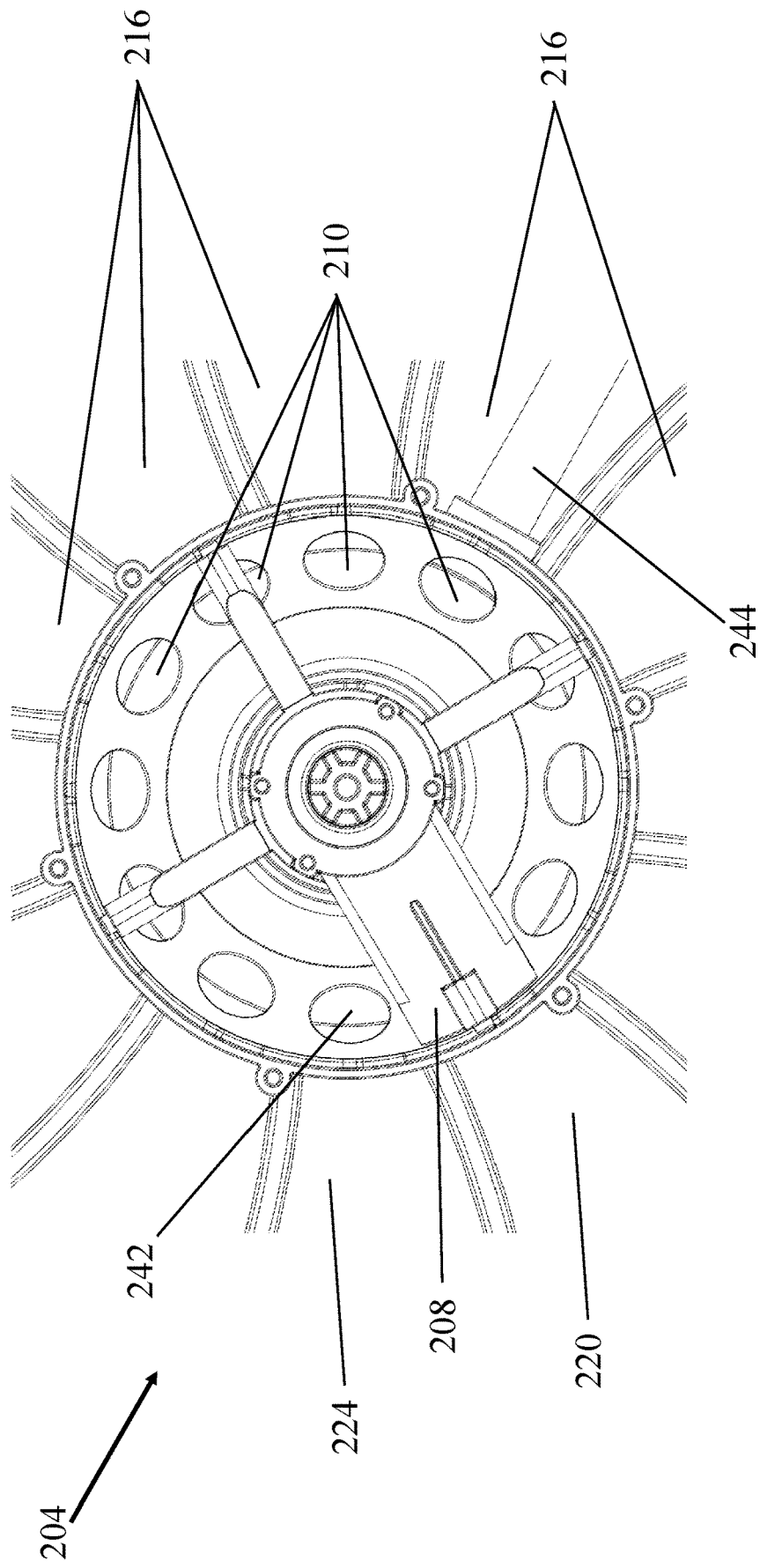
FIG. 7A is a top view of the control valve in a first position aligned with a first filtration chamber port.
Figure 7B:
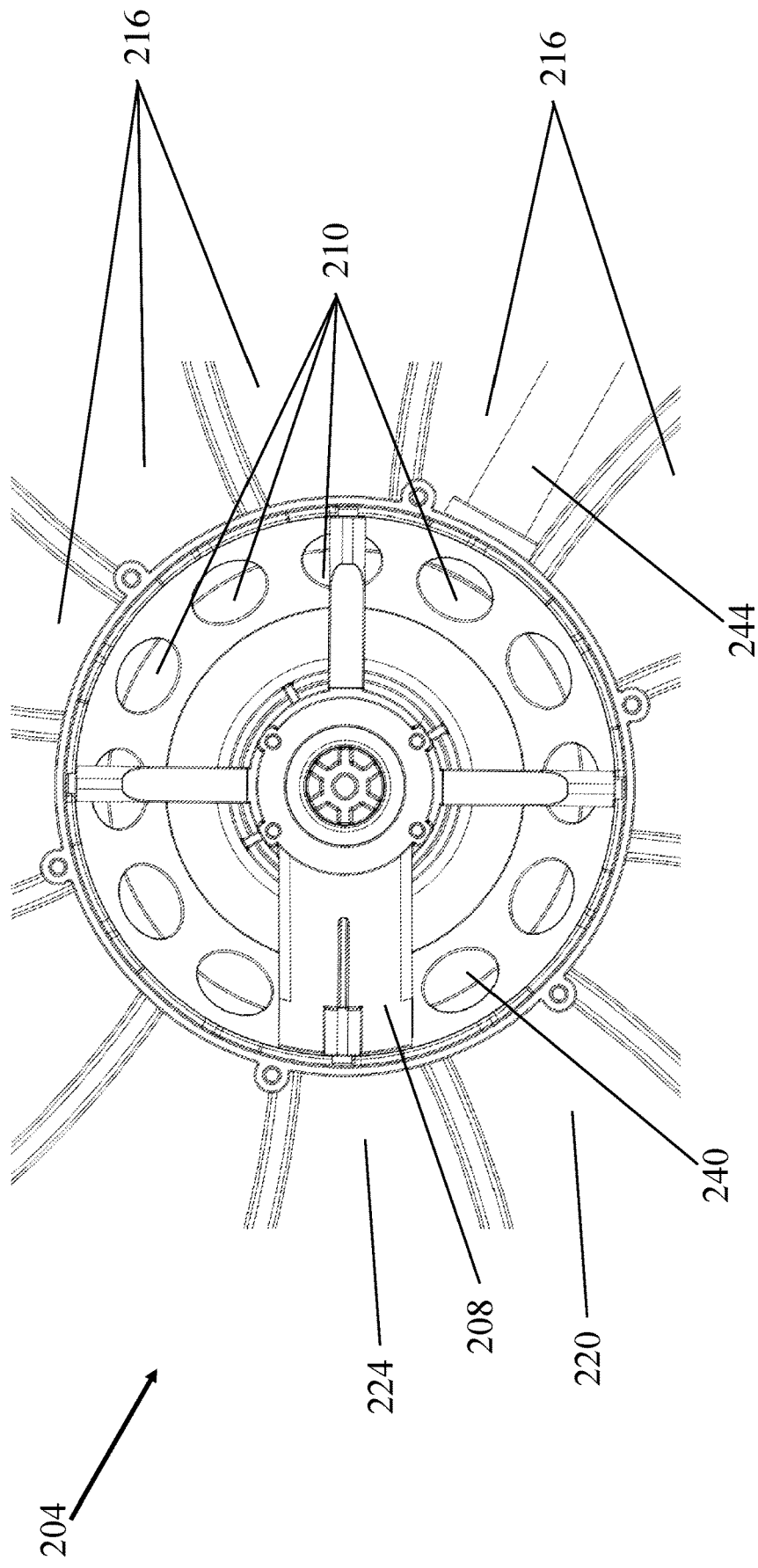
FIG. 7B is a top view of the control valve in a second position aligned with a second filtration chamber port.
Figure 7C:
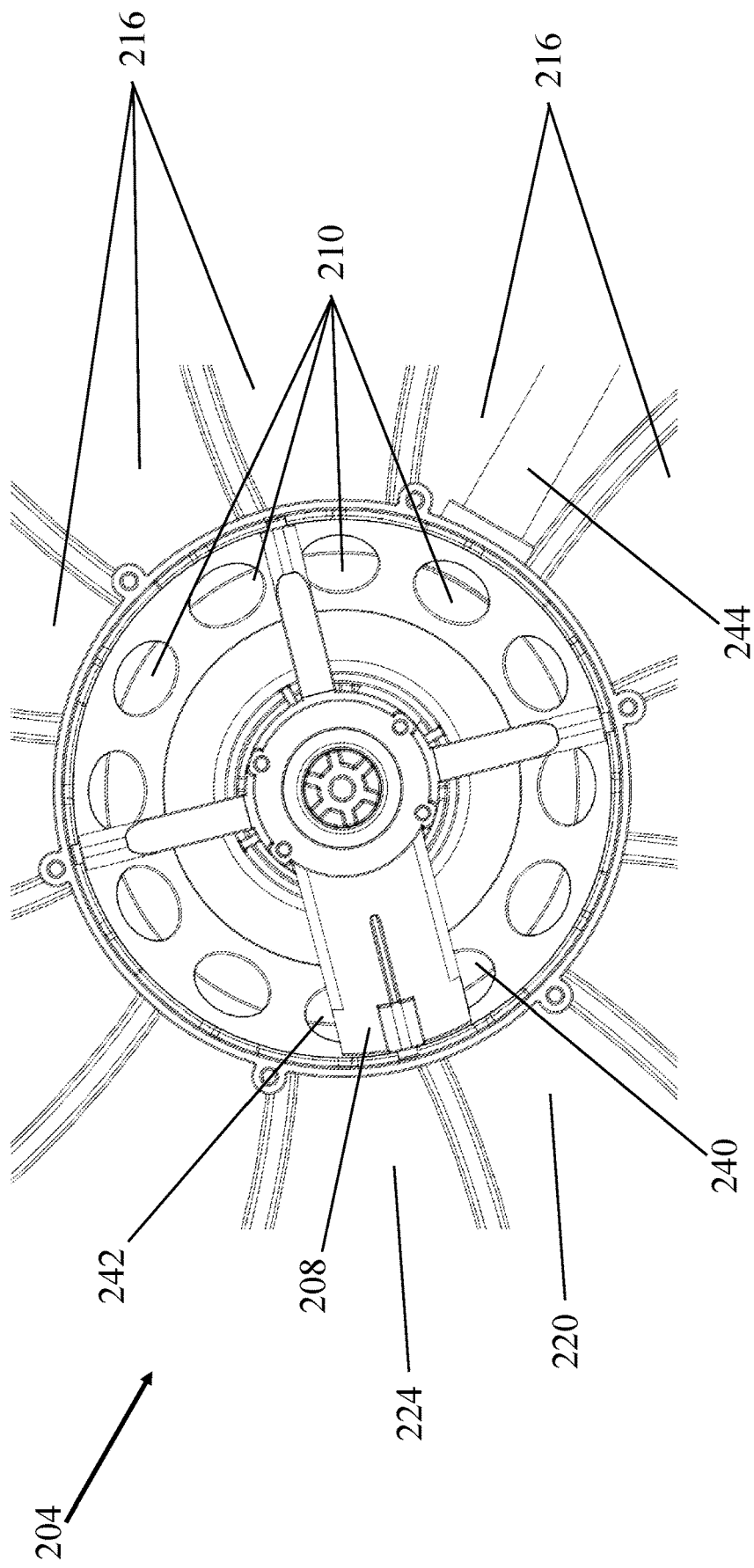
FIG. 7C is a top view of the control valve in an intermediate position between the first and second filtration chamber ports.
Figure 8:
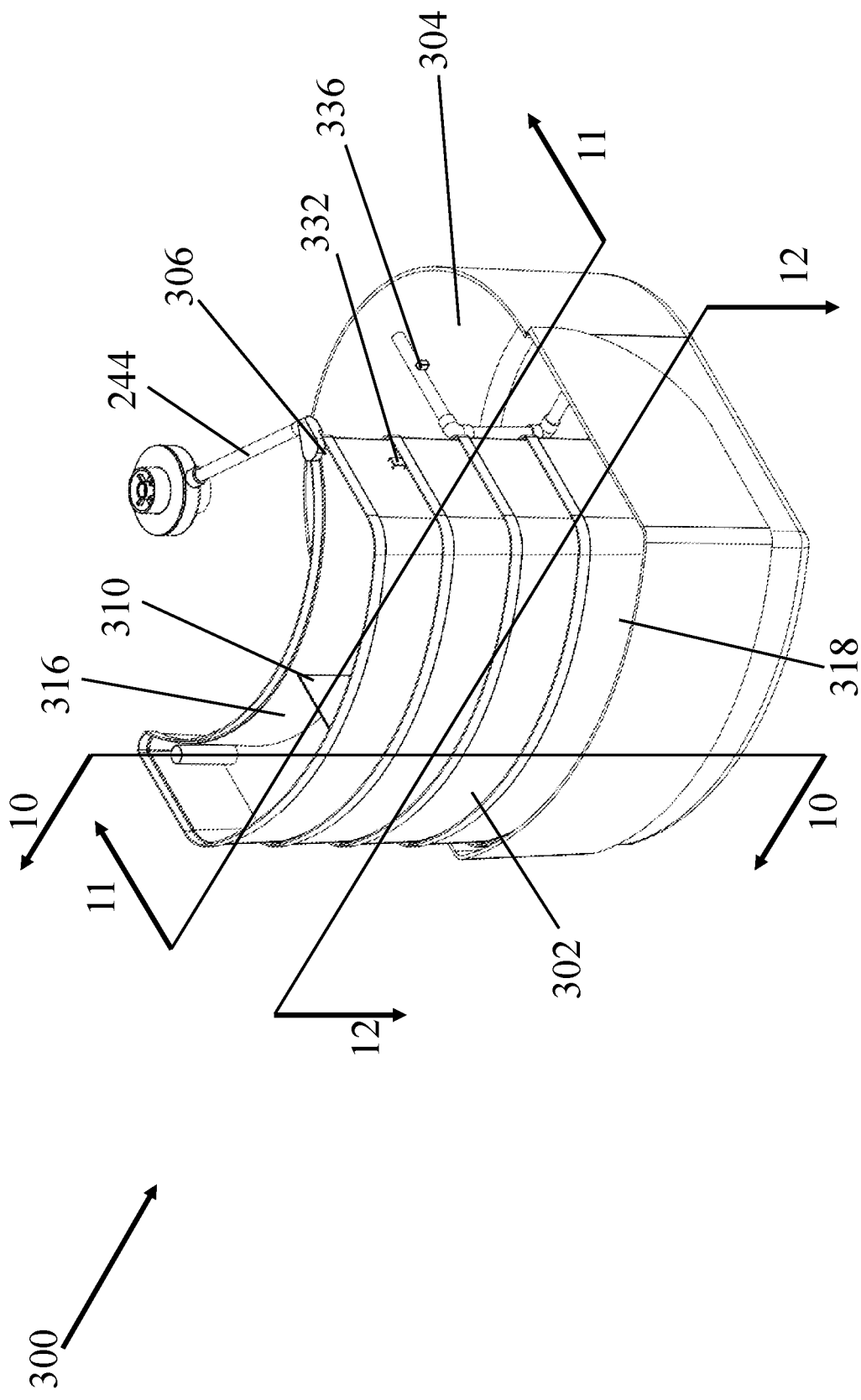
FIG. 8 is a perspective view of the backwash filtration system of FIG. 1.

FIG. 7C illustrates the backwash nozzle 208 in an intermediate position 246 between the first position 218 and the second position 222. When in the intermediate position 246, the backwash nozzle 208 is not aligned with any of the plurality of filtration chambers 216. Therefore, the backwash nozzle 208 does not limit the flow of water 104 from the control valve 204 to any of the plurality of filtration chambers 216. As a result, when the backwash nozzle 208 is in the intermediate position 246, the control valve 204 is configured to supply water 104 to all of the filtration chambers 216. Thus, the pool filter system 200 filters the water 104 in all of the filtration chambers 216 and does not backwash any filter media 226 when the backwash nozzle 208 is in the intermediate position 246. In this way, when the backwash nozzle 208 is in the intermediate position 246, the flow of water 104 may enter the pool filter system 200 from the pool of water 106 through the water supply inlet 202, pass through the control valve 204 into each of the plurality of filtration chambers 216, filter through the filter media 226, and then pass through the water return line 232 back to the pool of water 106. Generally, the internal backwash discharge valve 212 is closed when the backwash nozzle 208 is in the intermediate position 246.

FIGS. 8-12 illustrate a backwash filtration system 300. The backwash filtration system 300 may comprise the backwash discharge port 244, a sedimentation collection and separation system 302, and a final filtration chamber 304. The backwash discharge port 244 may be fluidly coupled with the pool filter system 200 and configured to pass backwashed water 104 from the pool filter system 200 to the sedimentation collection and separation system 302. The backwash discharge port 244 may pass the backwashed water 104 from the pool filter system 200 to the sedimentation collection and separation system 302 through an input port 306 of a first sedimentation chamber 316 of a plurality of sedimentation chambers 308.

Figure 11:
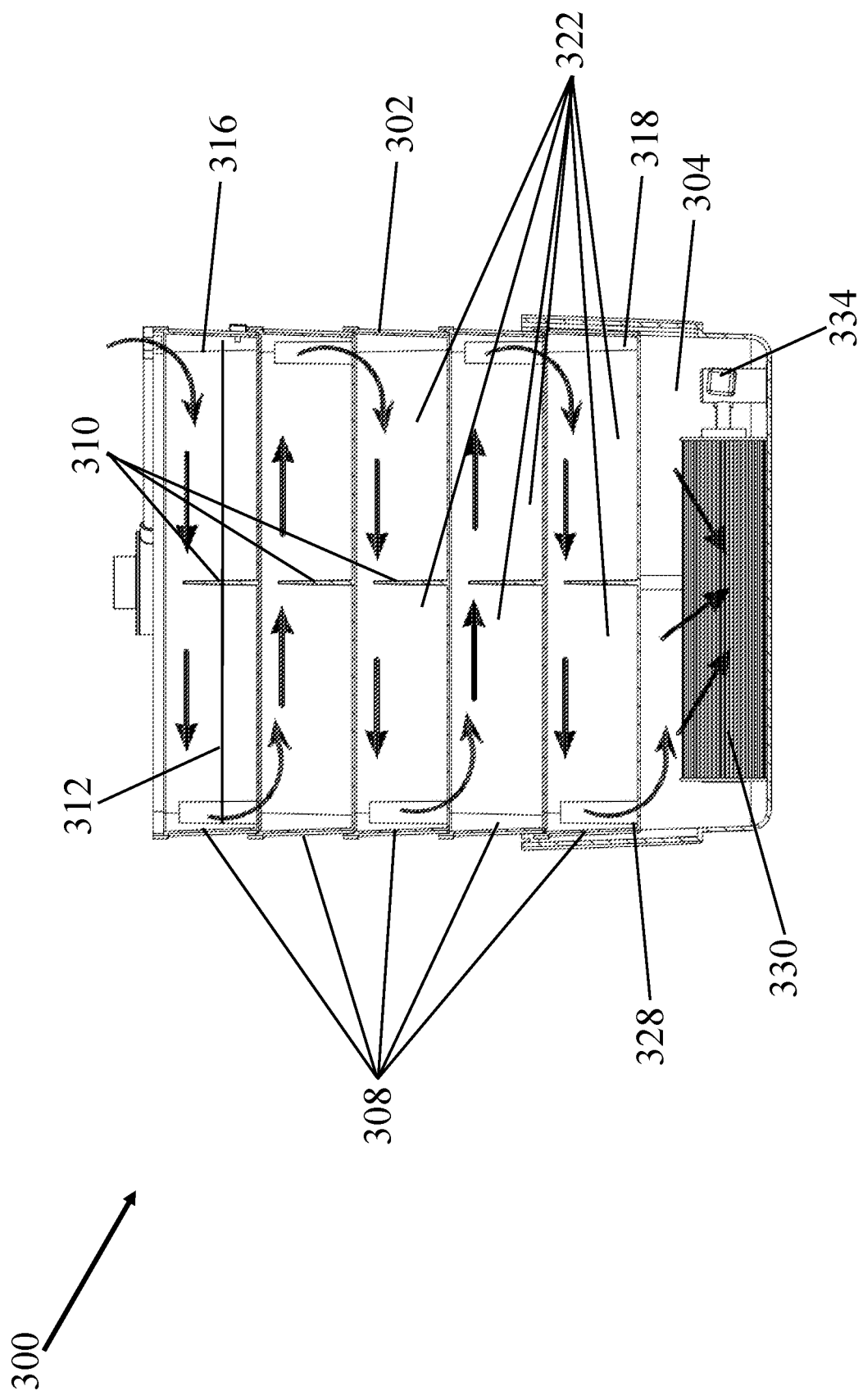
FIG. 11 is a cross section of the backwash filtration system from FIG. 8, taken along line 11-11.
Figure 12:
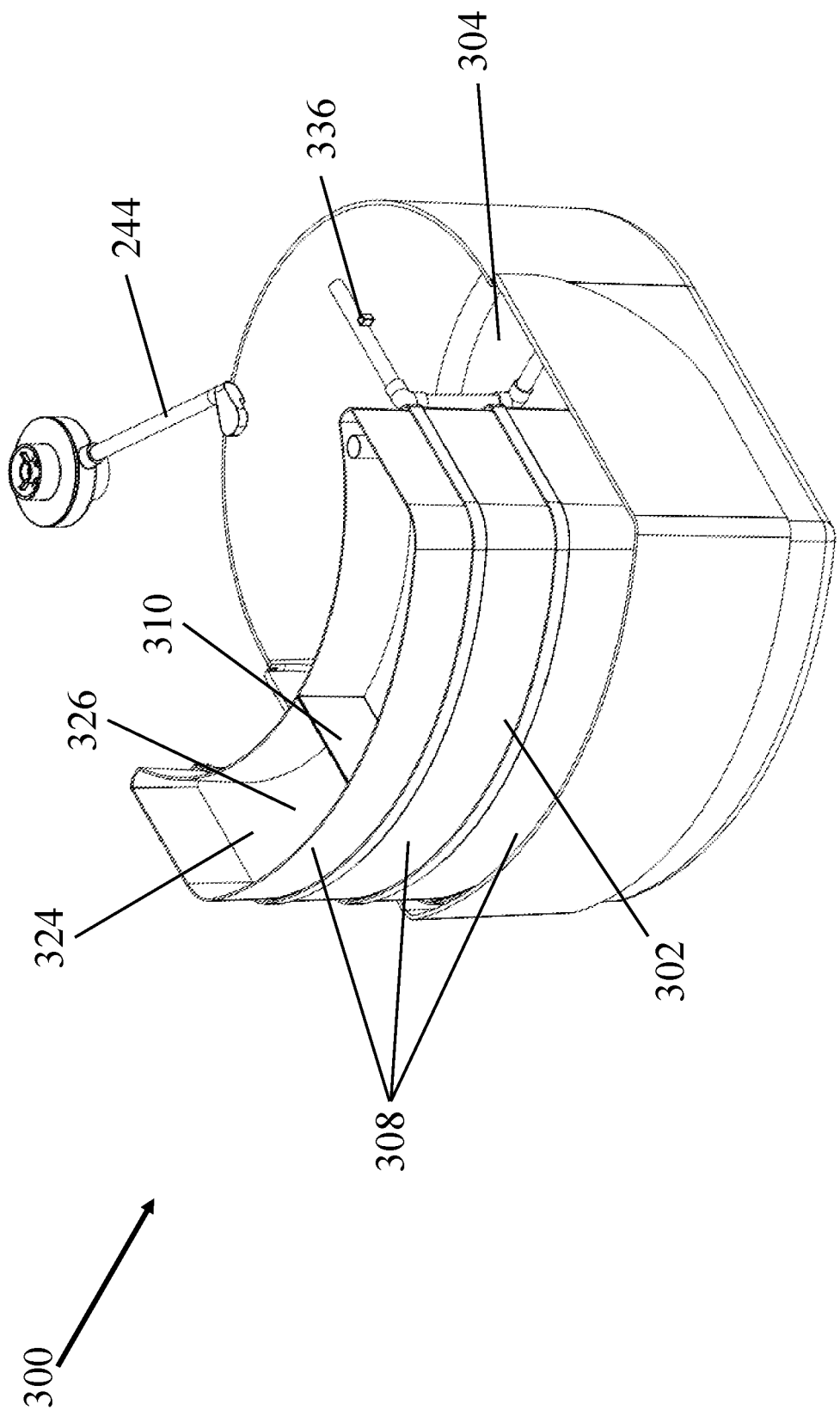
FIG. 12 is a cross section of the backwash filtration system from FIG. 8, taken along line 12-12.

The sedimentation collection and separation system 302 is configured to collect sediment 228 (not shown) out of the backwashed water 104 when the backwashed water 104 flows through the sedimentation collection and separation system 302. The sedimentation collection and separation system 302 may comprise the plurality of sedimentation chambers 308 and a plurality of baffles 310. Each of the plurality of sedimentation chambers 308 illustrated in FIG. 11 has a length 312 greater than its height 314 (see FIG. 10), and each is oriented with its respective length 312 positioned horizontally and may be stacked vertically above or below another of the plurality of sedimentation chambers 308 (FIG. 11). The path for water flow through the sedimentation collection and separation system 302 passes through the first sedimentation chamber 316 in a top position of the plurality of sedimentation chambers 308, through each of the plurality of sedimentation chambers 308 to a last sedimentation chamber 318 in a bottom position of the plurality of sedimentation chambers 308. The path for water flow passes through a majority of the length 312 of each of the sedimentation chambers 308 sequentially, and winds down through each of the plurality of sedimentation chambers 308.

The plurality of baffles 310 are configured to reduce the migration of sediment 228 within the flow of water 104 through the sedimentation collection and separation system 302. For the embodiment shown, the plurality of baffles 310 are located within the sedimentation collection and separation system 302 and span the width 320 of each of the plurality of sedimentation chambers 308. The plurality of baffles 310 thus create a series of pools 322 within the plurality of sedimentation chambers 308 that sequentially overflow into the next pool 322. This allows the sediment 228 to settle within each of the pools 322 so that the water 104 within each subsequent pool 322 contains less sediment 228 than the water 104 within the previous pools 322. Other locations and configurations are also contemplated.

The sedimentation collection and separation system 302 for this embodiment is configured to facilitate the flow of water 104 through the plurality of sedimentation chambers 308 at a predetermined velocity and a predetermined capacity that are selected to separate sediment 228 from the backwashed water 104 within a specified period of time. The velocity and capacity are based on the size and aspect ratio of the plurality of sedimentation chambers 308. The sedimentation collection and separation system 302 may also comprise a sedimentation collection tray 324 positioned at a bottom 326 of each of the sedimentation chambers 308. The sedimentation collection tray 324 may be removably coupled to the sedimentation collection and separation system 302 and may be configured to receive the sediment 228 from the backwashed water 104 as the backwashed water 104 passes through the respective sedimentation chamber 308 for manual removal from the sedimentation collection and separation system 302 (see FIG. 12).

The final filtration chamber 304 is fluidly coupled with the sedimentation collection and separation system 302, and is fluidly coupled with the last sedimentation chamber 318 through an output port 328 of the last sedimentation chamber 318. The volume of the final filtration chamber 304 may be used to determine the predetermined volume of backwash water discussed above in relation to the internal backwash discharge valve 212 of the pool filter system 200, where the capacity of the final filtration chamber 304 may be equal to the predetermined volume of backwash water. The final filtration chamber 304 has a final filtration medium 330 disposed within the final filtration chamber 304. The final filtration medium 330 is configured to filter the water 104 and return the water 104 to the pool filter system 200. In particular configurations, the filtered water 104 may be returned to the water return line 232 of the pool filter system 200. Methods such as venturi suction, a pumping system, a gravity drain, a return line to the suction side of the pool system pump, or other similar methods may be used to return the water 104 to the pool filter system 200.

Figure 9:
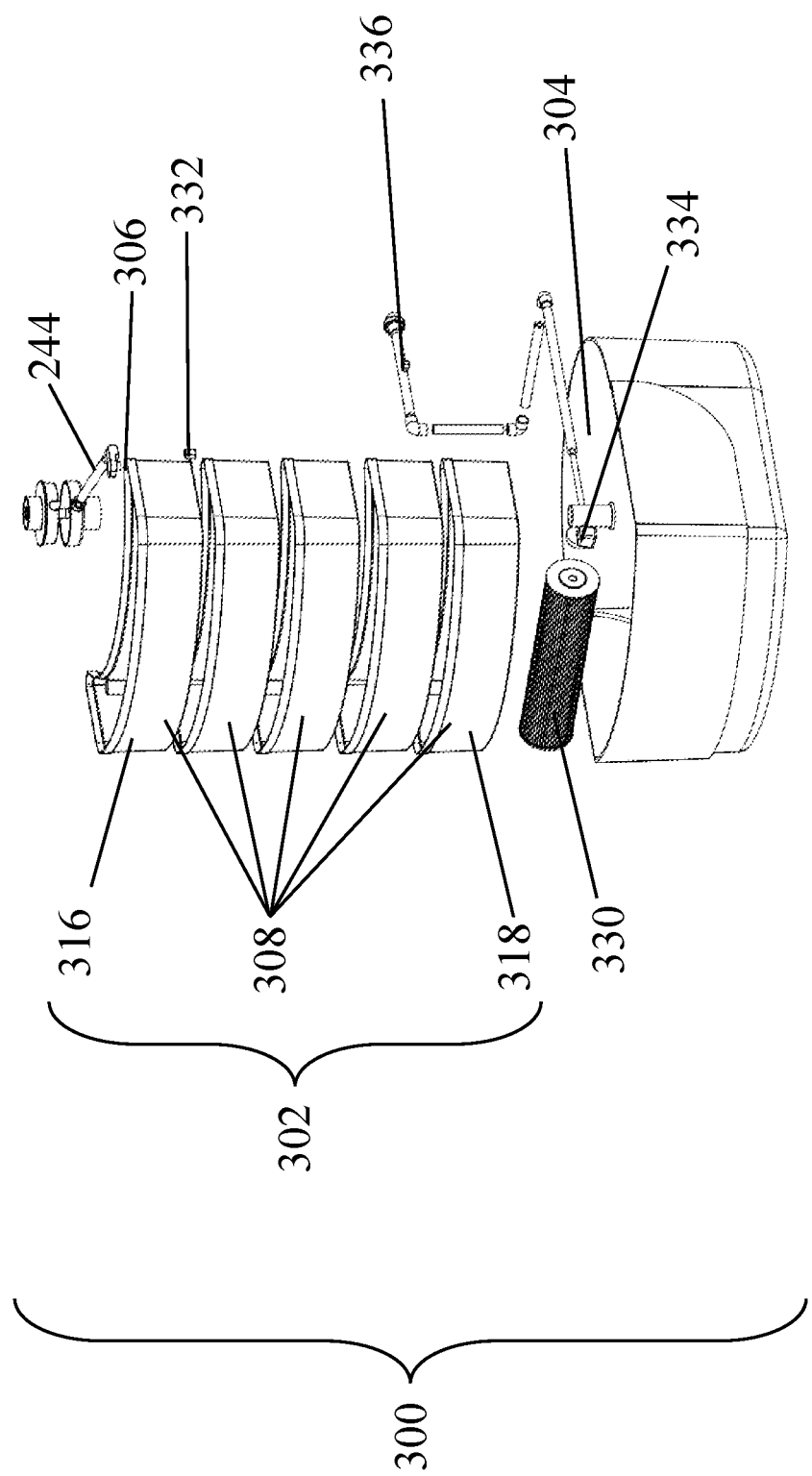
FIG. 9 is an exploded view of the backwash filtration system of FIG. 1.
Figure 10:
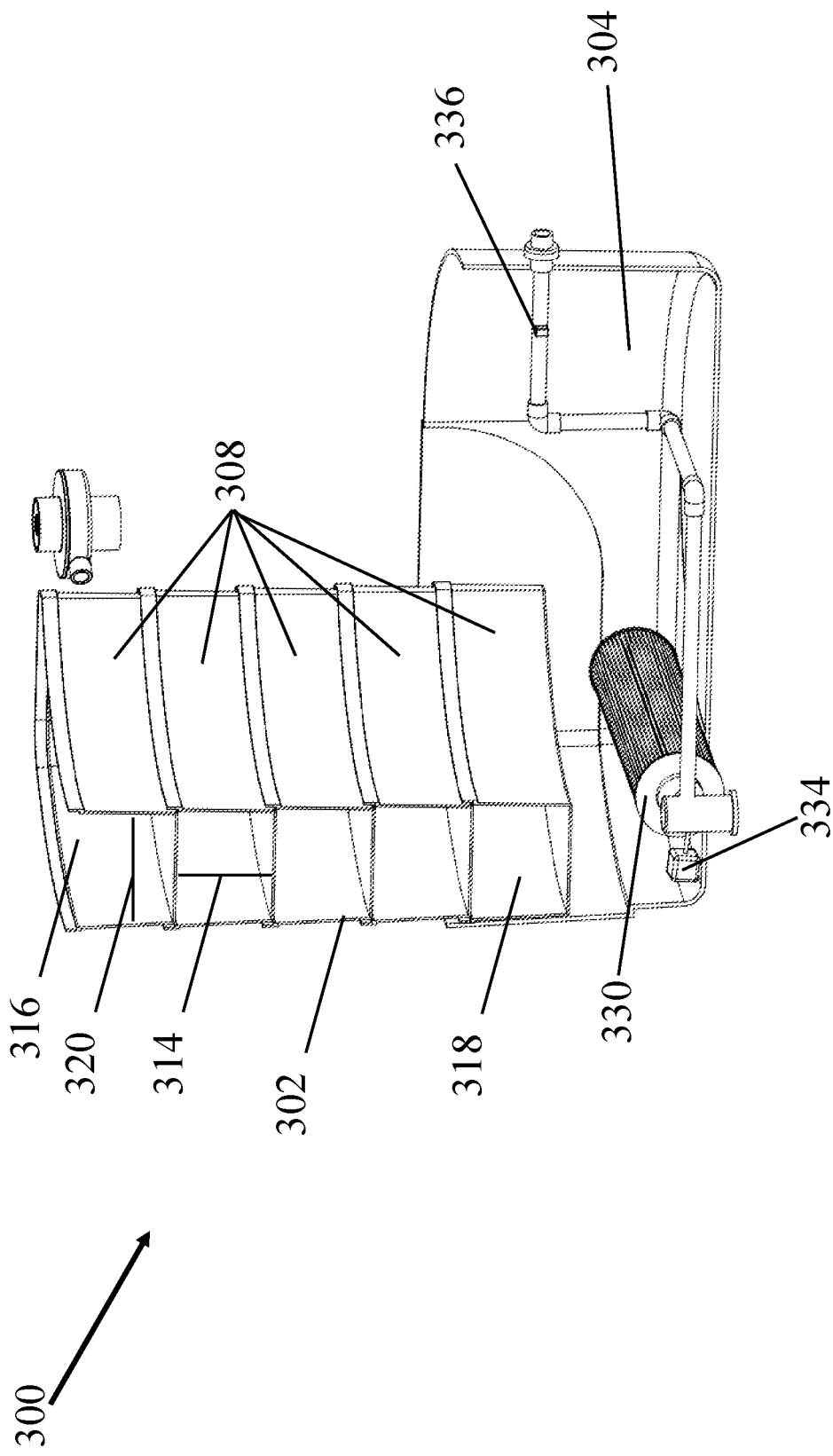
FIG. 10 is a cross section of the backwash filtration system from FIG. 8, taken along line 10-10.

The backwash filtration system 300 may also comprise a sedimentation sensor 332, a water level sensor 334, and/or a conditioning sensor 336 (see FIG. 9). The sedimentation sensor 332 may be configured to measure a level of sediment 228 deposited in at least one of the sedimentation chambers 308 and notify a user when the level of sediment 228 has reached a predetermined level (see FIG. 8) for emptying. In embodiments with a sedimentation collection tray 324, the sedimentation collection tray 324 may then be lifted out of the backwash filtration system 300 and the sedimentation collection tray 324 may then be cleaned and replaced in the backwash filtration system 300. In embodiments without a sedimentation collection tray 324, the plurality of sedimentation chambers 308 may also be lifted out of the backwash filtration system 300 and cleaned. The sediment 228 that is collected within the sedimentation collection and separation system 302 may thus be removed from the backwash filtration system 300. Because the sedimentation collection and separation system 302 is not located within the pressurized portion of the pool filter system 200, the sedimentation collection trays 324 and the plurality of sedimentation chambers 308 may be removed and cleaned without interrupting the normal operation of the pool filter system 200.

A water level sensor 334 may be located within the final filtration chamber 304 and configured to automatically turn on or shut off the flow of filtered water 104 to the water return line 232 of the pool filter system 200 or to the pool of water 106 when the water level within the final filtration chamber 304 has reached one or more predetermined levels. The water level sensor 334 may be a float valve or any similar mechanical or electrical automatic switching device. The water level sensor 334, in particular embodiments, limits over-draining of the final filtration chamber 304 and thus limits the introduction of air into the pool system. The conditioning sensor 336 may be configured to sense water conditions and provide conditioning to the water 104 based on the water conditions. Thus, additional water treatment methods, including chemicals, supplements, or conditioning, may be introduced into the pool of water 106 through the pool filter system as needed or desired.

The pool filter system 200 and the backwash filtration system 300 may be used to implement a method for simultaneous filtration and non-discharge backwash operation of a pool filter. Such a method may comprise any or all of the following, as illustrated in FIG. 2. First, water 104 is received from the pool of water 106 through the water supply inlet 202 of the pool filter housing 108. The water 104 is then passed within the pool filter housing 108 to the control valve 204 and split into the first stream of water 236 and the second stream of water 238. The first stream of water 236 is forced in a first direction 248 through each of the plurality of filtration chambers 216 except the filtration chamber aligned with the backwash nozzle 208 and the second stream of water 238 is forced in a second direction 250, opposite the first direction 248, through the filtration chamber aligned with the backwash nozzle 208, and then through the backwash nozzle 208. The first direction 248 may be a downward direction and the second direction 250 may be an upward direction, opposite the first direction 248.

The first stream of water 236 may be filtered through the filter media 226 within each of the plurality of filtration chambers 216. The backwash nozzle 208 may then be rotated to a subsequent position, such as from the first position 218 to the second position 222, and the step of forcing the water 104 in a first direction 248 and a second direction 250 may be repeated. The step of forcing the second stream of water 238 through the filtration chamber aligned with the backwash nozzle 208 may comprise backwashing the second stream of water 238 through the filtration chamber aligned with the backwash nozzle 208. The backwash nozzle 208 may be paused in the intermediate position 246 for a predetermined amount of time, during which time the water 104 may be forced in the first direction 248 through each of the plurality of filtration chambers 216. During the time that the backwash nozzle 208 is in the intermediate position 246, the internal backwash discharge valve 212 remains closed. The internal backwash discharge valve 212 may be opened for a predetermined interval when the backwash nozzle 208 is aligned with a filtration chamber 216 and the second stream of water 238 may be passed through the internal backwash discharge valve 212 and the backwash discharge port 244 to the sedimentation collection and separation system 302. The sediment 228 may then be settled out of the second stream of water 238 within the sedimentation collection and separation system 302 and the second stream of water 238 may be passed to the final filtration chamber 304. The second stream of water 238 may then be filtered through the final filtration media 330 within the final filtration chamber 304, and the first stream of water 236 and the second stream of water 238 may then be returned to the pool of water 106.

Additionally, a level of sediment 228 deposited in the sedimentation collection and separation system 302 may be measured and a user may be notified when the level of sediment 228 reaches a predetermined level. A level of water 104 may be measured within the final filtration chamber 304 and the flow of the second stream of water 238 through the final filtration media 330 may be shut off when the water level within the final filtration chamber 304 reaches a predetermined minimum level. The water conditions in the final filtration chamber 304 may be sensed and conditioning may be provided to the water 104 within the final filtration chamber 304 to alter the water conditions.

It will be understood that implementations of a non-discharge backwash filter system are not limited to the specific assemblies, devices and components disclosed in this document, as virtually any assemblies, devices and components consistent with the intended operation of a non-discharge backwash filter system. Accordingly, for example, although particular non-discharge backwash filter systems, and other assemblies, devices and components are disclosed, such may include any shape, size, style, type, model, version, class, measurement, concentration, material, weight, quantity, and/or the like consistent with the intended operation of non-discharge backwash filter systems. Implementations are not limited to uses of any specific assemblies, devices and components; provided that the assemblies, devices and components selected are consistent with the intended operation of a non-discharge backwash filter system.

Accordingly, the components defining any non-discharge backwash filter system implementations may be formed of any of many different types of materials or combinations thereof that can readily be formed into shaped objects provided that the components selected are consistent with the intended operation of a non-discharge backwash filter system implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various non-discharge backwash filter systems may be manufactured using conventional procedures as added to and improved upon through the procedures described here. Some components defining a non-discharge backwash filter system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that non-discharge backwash filter systems are not limited to the specific order of steps as disclosed in this document. Any steps or sequence of steps of the assembly of a non-discharge backwash filter system indicated herein are given as examples of possible steps or sequence of steps and not as limitations, since various assembly processes and sequences of steps may be used to assemble non-discharge backwash filter systems.

The implementations of a non-discharge backwash filter system described are by way of example or explanation and not by way of limitation. Rather, any description relating to the foregoing is for the exemplary purposes of this disclosure, and implementations may also be used with similar results for a variety of other applications employing a non-discharge backwash filter system.

What is claimed is:
1. A swimming pool backwash filtration system, comprising:
    a swimming pool filter system configured to pass backwashed water from the swimming pool filter system to an input port of a first sedimentation chamber of a plurality of sedimentation chambers, each of the plu- rality of sedimentation chambers having a length greater than a height and each being oriented with its respective length positioned horizontally and stacked vertically above or below another of the plurality of sedimentation chambers, wherein a path for backwashed water flowing through the backwash filtration system passes through from the first sedimentation chamber in a top position of the plurality of sedimentation chambers through each of the plurality of sedimentation chambers to a last sedimentation chamber in a bottom position of the plurality of sedimentation chambers with the backwashed water passing through a majority of the length of each of the sedimentation chambers sequentially;

a plurality of baffles within the plurality of sedimentation chambers configured to reduce migration of sediment within the backwashed water through the backwash filtration system, wherein the backwash filtration system is configured to facilitate the flow of backwashed water through the respective plurality of sedimentation chambers at a predetermined velocity and a predetermined capacity, wherein the predetermined velocity and the predetermined capacity are selected to separate the sediment from the backwashed water within a specified period of time; and wherein each of the sedimentation chambers comprises a sedimentation collection tray positioned at a bottom of each respective sedimentation chamber, each sedimentation collection tray removably coupled to the backwash filtration system and configured to receive the sediment from the backwashed water as the backwashed water passes through the respective sedimentation chamber for manual removal from the backwash filtration system.

2. The backwash filtration system of claim 1, further comprising a sedimentation sensor configured to measure a level of the sediment deposited in at least one of the sedimentation chambers and notify a user when the level of the sediment has reached a predetermined level.

3. The backwash filtration system of claim 1, wherein each of the plurality of baffles spans a width of each of the plurality of sedimentation chambers.

4. The backwash filtration system of claim 1, wherein the plurality of baffles is configured to create a series of pools within the plurality of sedimentation chambers each configured to sequentially overflow into a next pool of the series of pools.

5. A swimming pool backwash filtration system, comprising:

a plurality of sedimentation chambers each stacked vertically above or below another sedimentation chamber of the plurality of sedimentation chambers, wherein a path for backwashed water from a swimming pool filter system flowing through the swimming pool backwash filtration system passes from a first sedimentation chamber in a top position of the plurality of sedimentation chambers down through each of the plurality of sedimentation chambers to a last sedimentation chamber in a bottom position of the plurality of sedimentation chambers with the backwashed water passing through a majority of a length of each of the sedimentation chambers sequentially;

a plurality of baffles within the plurality of sedimentation chambers configured to reduce migration of sediment within the backwashed water through the backwash filtration system; and wherein each of the sedimentation chambers comprising a sedimentation collection tray positioned at a bottom of each respective sedimentation chamber and configured to receive the sediment from the backwashed water as the backwashed water passes through the respective sedimentation chamber for manual removal from the backwash filtration system.

6. The backwash filtration system of claim 5, further comprising a pool filter system configured to pass the backwashed water from the pool filter system to an input port of the first sedimentation chamber.

7. The backwash filtration system of claim 5, wherein the backwash filtration system is configured to facilitate the flow of the backwashed water through the respective plurality of sedimentation chambers at a predetermined velocity and a predetermined capacity, wherein the predetermined velocity and the predetermined capacity are selected to separate the sediment from the backwashed water within a specified period of time.

8. The backwash filtration system of claim 5, wherein a sedimentation collection tray is removably coupled to the backwash filtration system.

9. The backwash filtration system of claim 5, further comprising a sedimentation sensor configured to measure a level of the sediment deposited in at least one of the sedimentation chambers and notify a user when the level of the sediment has reached a predetermined level.

10. The backwash filtration system of claim 5, wherein each of the plurality of baffles spans a width of each of the plurality of sedimentation chambers.

11. The backwash filtration system of claim 5, wherein the plurality of baffles is configured to create a series of pools within the plurality of sedimentation chambers each configured to sequentially overflow into a next pool of the series of pools.

12. A backwash filtration system, comprising:

a plurality of sedimentation chambers, wherein a path for backwashed water from a swimming pool filter system flowing through the backwash filtration system passes through from a first sedimentation chamber of a plurality of sedimentation chambers and through each of the plurality of sedimentation chambers to a last sedimentation chamber of the plurality of sedimentation chambers with the backwashed water passing through a majority of a length of each of the sedimentation chambers sequentially; and a plurality of baffles within the plurality of sedimentation chambers configured to reduce migration of sediment within the backwashed water flowing through the backwash filtration system; and wherein each of the plurality of sedimentation chambers comprises a sedimentation collection tray removably coupled to the backwash filtration system at a bottom of each of the sedimentation chambers, and each sedimentation collection tray is configured to receive the sediment from the backwashed water as the backwashed water passes through the respective sedimentation chamber for manual removal from the backwash filtration system.

13. The backwash filtration system of claim 12, wherein each of the plurality of sedimentation chambers is stacked vertically above or below another of the plurality of sedimentation chambers.

14. The backwash filtration system of claim 13, wherein the first sedimentation chamber is in a top position, the last sedimentation chamber is in a bottom position, and the path for the backwashed water through the backwash filtration system passes down through each of the plurality of sedimentation chambers, beginning at the first sedimentation chamber and ending with the last sedimentation chamber.

15. The backwash filtration system of claim 12, further comprising the swimming pool filter system and wherein the swimming pool filter system is configured to pass the backwashed water from the pool filter system to an input port of the first sedimentation chamber.

16. The backwash filtration system of claim 12, each of the plurality of sedimentation chambers having a length greater than a height, and each of the plurality of sedimentation chambers being oriented with its respective length positioned horizontally.

17. The backwash filtration system of claim 12, wherein the backwash filtration system is configured to facilitate the flow of the backwashed water through the respective plurality of sedimentation chambers at a predetermined velocity and a predetermined capacity, wherein the predetermined velocity and the predetermined capacity are selected to separate the sediment from water within a specified period of time.

18. The backwash filtration system of claim 12, further comprising a sedimentation sensor configured to measure a level of the sediment deposited in at least one of the sedimentation chambers and notify a user when the level of the sediment has reached a predetermined level.

19. The backwash filtration system of claim 12, wherein the plurality of baffles is configured to create a series of pools within the plurality of sedimentation chambers each configured to sequentially overflow into a next pool of the series of pools.

20. The backwash filtration system of claim 12, wherein the path for backwashed water from a swimming pool filter system further returns to a swimming pool from which the backwashed water flows after passing through the majority of the length of each of the sedimentation chambers sequentially.

* * * * *